Figure 1:
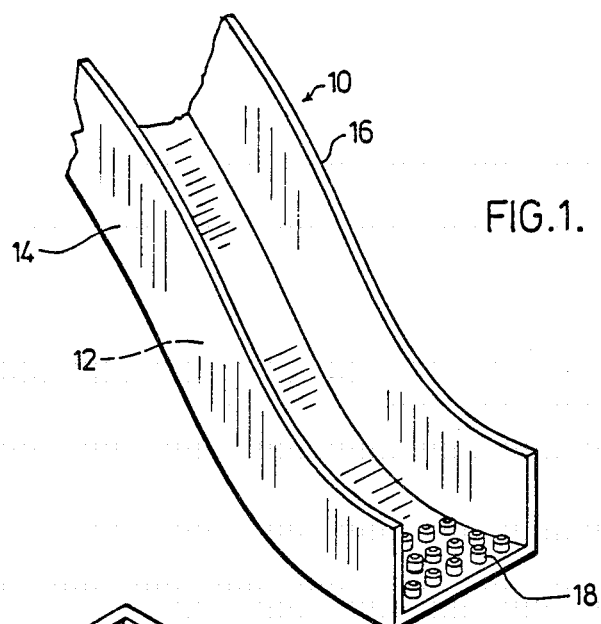

United States Patent [19]

Silins et al.

[11] Patent Number: 4,547,985
[45] Date of Patent: Oct. 22, 1985

[54] METHOD OF PROTECTING A METALLIC SURFACE SUSCEPTIBLE TO ABRASION BY ROCK-LIKE MATERIAL

[75] Inventors: Vilnis Silins, Edmonton; Jerome H. Tameling, Fort Saskatchewan, both of Canada

[73] Assignee: Sherritt Gordon Mines Limited, Toronto, Canada

[21] Appl. No.: 401,226

[22] Filed: Jul. 23, 1982

Related U.S. Application Data

[63] Continuation of Ser. No. 128,433, Mar. 10, 1980, abandoned.

[30] Foreign Application Priority Data

Mar. 20, 1979 [GB] United Kingdom ............... 79 09826

[51] Int. Cl.³ ........................... E02F 3/00; E02F 7/00; E02F 9/28
[52] U.S. Cl. ............................. 37/118 R; 37/141 R; 193/2 R; 172/701.1; 172/747; 219/98; 428/557; 428/572
[58] Field of Search .......... 219/98; 37/118 R, 141 R, 37/141 T, 142 R; 193/2 R, 32; 172/701.1, 719, 745, 747, 772; 428/557, 572

[56] References Cited

U.S. PATENT DOCUMENTS

| | | | |
|---|---|---|---|
| 2,477,765 | 8/1949 | Nelson | 219/98 |
| 2,584,491 | 2/1952 | Nelson | 219/98 |
| 2,635,167 | 4/1953 | Nelson | 219/99 |
| 3,363,933 | 1/1968 | Wilson | 298/1 H |
| 3,599,737 | 8/1971 | Fischer | 175/374 |
| 3,693,736 | 9/1972 | Gardner | 175/410 |
| 3,975,107 | 8/1976 | Molyneux et al. | 403/271 |
| 3,993,887 | 11/1976 | Richards | 219/99 |
| 4,074,449 | 2/1978 | Lanz et al. | 228/114 |
| 4,129,952 | 12/1978 | Olson | 37/118 R |

FOREIGN PATENT DOCUMENTS 1075969 7/1967 United Kingdom .................. 219/99

Primary Examiner—Teddy S. Gron
Assistant Examiner—Matthew A. Thexton
Attorney, Agent, or Firm—Stevens, Davis, Miller & Mosher

[57] ABSTRACT

This invention relates to the protection of metallic surfaces susceptible to abrasion by rock-like material. According to the invention, a metallic surface susceptible to abrasion by rock-like material is protected by stud welding studs of abrasion resistant metallic material to the metallic surface in closely spaced relationship to cause the majority of the rock-like material to contact the abrasion resistant studs instead of the metallic surface. Typical of such metallic surfaces are a ground engaging tool, earth-working equipment, or chutes for conveying the rock-like material. The abrasion resistant metallic material comprising the stud can be formed of cast material of compacted metallic powder.

21 Claims, 6 Drawing Figures

METHOD OF PROTECTING A METALLIC SURFACE SUSCEPTIBLE TO ABRASION BY ROCK-LIKE MATERIAL

This is a continuation of application Ser. No. 128,433 filed Mar. 10, 1980, now abandoned.

This invention relates to the protection of metallic surfaces susceptible to abrasion by rock-like material.

There are various industrial operations in which a metallic surface is susceptible to significant abrasion by rock-like material, for example, the upper surface of a chute down which rock-like material passes and upon which the rock-like material impinges with considerable force as a result of its falling down the chute. Another example is a surface at the leading end of a ground engaging tool of an earth working machine, such as a loading shovel or drag-line bucket, over which rock-like material passes as it is removed from the ground and forced over the surface concerned.

Although such surfaces are usually made of hard wearing metallic material, such surfaces nevertheless become abraded after a period of time to such an extent that they have to be renewed. However, such renewal is difficult because the surface is usually an integral part of at least a major component of the equipment concerned, such as a chute or ground engaging tool. Since such equipment is generally of relatively large size, it is impractical to transport the equipment to a repair shop.

Renewal of such hard wearing metallic surfaces is conventionally carried out in situ by arc welding a consumable electrode of the desired material onto the surface to form a new surface layer. However, this practice is time-consuming and expensive because arc welding a new surface layer requires the presence of an operator with a relatively high level of welding skill, and further is not entirely satisfactory because the range of wear-resistant materials which can be welded by such conventional arc welding is somewhat limited. Often, a preferred wear-resistant material is not satisfactorily weldable by such arc welding, and a less desirable material has to be used because it can be welded to form a new surface layer. Also, the material is usually diluted with iron during arc welding, and such chemical dilution alters the wear characteristics of the material. Even when a preferred wear-resistant material can be satisfactorily welded by such arc welding, the cost of the operation is undesirably high because of the requirement for a relatively highly skilled operator and the time involved.

It is therefore an object of the invention to provide a method of protecting metallic surfaces susceptible to abrasion by rock-like material which overcomes the above mentioned disadvantages.

According to the invention, a metallic surface susceptible to abrasion by rock-like material is protected by stud welding studs of abrasion resistant metallic material to the surface in closely spaced relationship to cause the majority of the rock-like material to contact the abrasion resistant studs instead of the surface.

Such welding can be carried out by equipment of the kind used for electric arc welding stud fasteners in place. Hence, the operator can be a lesser skilled person, and less time is needed to carry out the welding operation. Further, a wider range of materials can be applied by use of the present invention than with conventional arc welding.

Thus, for example, ground engaging tools or chutes of the kind previously mentioned can be provided with abrasion resistant surfaces in situ by an operator by use of equipment which is not only less skill demanding but is also less fatiguing to use than equipment of the kind required for conventional arc welding. The advantages of the present invention when used in connection with ground engaging tools or chutes for example are therefore readily apparent.

Advantageously, the studs are of cast abrasion resistant metallic material. Alternatively however, the studs may be made of metal powder compacted by known powder metallurgy techniques. Each stud may comprise a first portion of abrasion resistant metallic material weldable to the surface and a second metallic portion attachable to stud-welding equipment, with the first portion being connected to the second portion by frangible metallic connecting means, with the second portions of the studs being removed after stud welding by breaking the connecting means. The second portion may be made of a material other than the material of which the first portion is made, for example the second portion may be made of a cheaper material. Alternatively, the first and second portions and connecting means may be made of the abrasion resistant metallic material and form an integral stud.

The surface may be that of a chute down which rock-like material is passed, or may be located adjacent to the leading edge of earth-working equipment which in use engages rock-like material in the ground.

Figure 2:
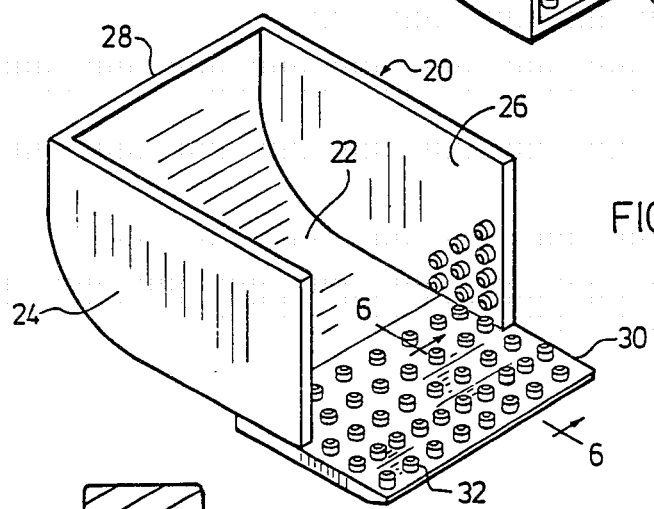
Figures 3, 4, 5:
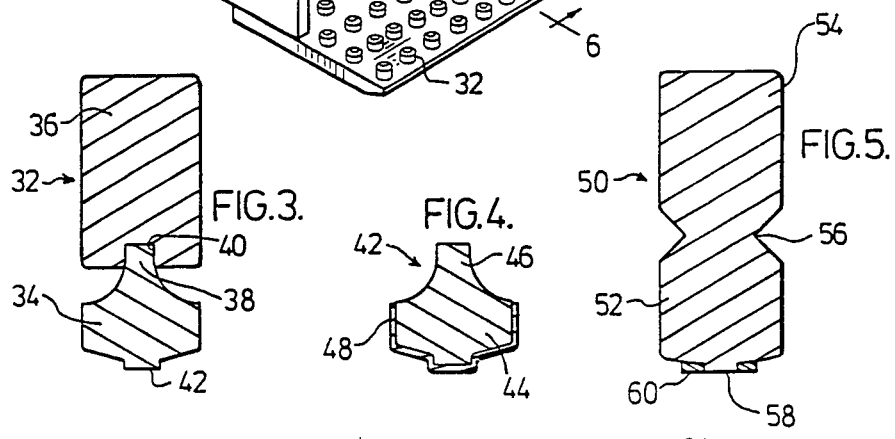
Figure 6:
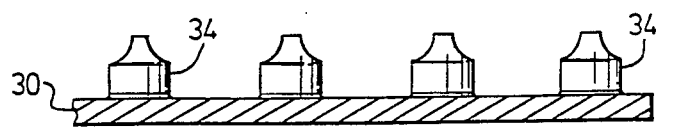

Embodiments of the invention will now be described, by way of example, with reference to the accompanying drawings, of which:

FIG. 1 is a perspective view of a discharge chute with studs welded to the lower end in accordance with the invention, FIG. 2 is a similar view of a ground engaging tool with a forwardly projecting portion to which studs have been welded in accordance with the invention, FIG. 3 is a sectional view of a stud according to one embodiment of the invention, FIG. 4 is a similar view of a stud according to another embodiment, FIG. 5 is a similar view of a stud according to a further embodiment, and FIG. 6 is a sectional view along the line 6—6 of FIG. 2.

Referring first to FIG. 1, a discharge chute 10 for conveying rock-like material from one level to a lower level has an inclined curved base 12 with side walls 14, 16. The base 12 is of hard wearing steel, and in accordance with the invention the surface of the base 12 at the lower end of the chute is protected by studs 18 of cast abrasion resistant metallic material, such as a high carbon chromium iron alloy. The studs are welded to the surface of the base 12 by electric arc stud welding equipment in closely spaced relationship, preferably as close as the stud-welding equipment will allow, in a close packed array.

The stud spacing may be up to ten times the stud diameter to provide general protection and one to two times for more severe conditions. Generally, the initial stud height should be in the range of from about 0.1 to about 2 times the stud diameter and preferably in the range of from about ⅓ to about ½ times the diameter for most applications.

In one specific example, the studs 18 each had a diameter of ⅝th inch, and the spacing between each stud from centre to centre was 1 inch. There were 60 studs on a rectangular surface measuring 6 inches by 11 inches, and the initial height of each stud was equal to about half its diameter.

In the absence of the studs 18, the lower end of the base 12 of the chute 10 would be abraded by the rock-like material falling down the chute to such an extent that repair would be necessary after a relatively short period of time. As previously mentioned, it has been conventional practice to arc weld a consumable electrode of suitable material onto a surface to form a new surface layer, with this practice being time-consuming and expensive. In contrast, with the present invention, the studs 18 can be applied with stud welding equipment by a less skilled person, with less time being required.

FIG. 2 shows a ground engaging tool in the form of a mechanical shovel 20 which in use is part of an earth moving machine. The shovel 20 has a base 22 of hard wearing steel, side walls 24, 26 and a rear wall 28. The base 22 has a leading end portion 30 which projects beyond the side walls 24, 26.

A person skilled in the art will readily appreciate that the chute of FIG. 1 and the ground engaging tool of FIG. 2 are only two examples of industrial applications of the invention, and that there are many other possible applications.

The upper surface of the projecting portion 30 is protected by studs 32 is a similar manner to the protection by studs 18 in the embodiment of FIG. 1. In use, the projecting portion 30 digs into the ground and, in the absence of the studs 30, rock-like material in the ground would be forced into engagement with the upper surface of the projecting portion 30 and cause relatively rapid wear thereto. With the present invention, the rock-like material primarily engages the studs rather than the surface of the projecting portion 30 itself.

FIG. 3 shows one form of stud suitable for use in the present invention. The stud 32 has a main body portion 34 and a secondary portion 36 of larger mass than the main body portion 34. The main body portion 34 is of steel alloy containing about 4% carbon and about 33% chromium, with the balance being iron. The body portion 34 has an upwardly projecting spigot 38 which is a tight fit in a recess 40 in one end of the secondary portion 36, which is made of mild steel. The lower end of the main body portion 34 has an aluminum tip 42 cold welded thereto.

The complete stud 32 is fitted into electric arc stud welding equipment and the lower end of the main body portion 34 is welded to the steel surface to be protected. The aluminum tip 42 functions as an oxygen getter or fluxing agent by forming aluminum oxide which then floats away during the welding operation to leave a clean weld. After welding, the secondary portion 36 is struck by a hammer or other implement to break off the spigot 38 from the main body portion 34, thereby removing the secondary portion 36 and spigot 38 and leaving the main body portion 34 of abrasion resistant steel alloy welded to the surface concerned. Thus, in use, the initial stud height is the height of the main body portion 34.

The secondary portion 36 is of relatively inexpensive material compared to the main body portion 34, and is provided to facilitate the stud welding of the main body portion 34.

FIG. 4 shows an alternative stud 42 having a body 44 similar to the main body portion 34 of the stud of FIG. 3, and having a rear spigot 46 to facilitate engagement with stud welding equipment. The body 44 has a mild steel sheath 48 brazed thereto to facilitate welding of the stud to the surface.

FIG. 5 shows another alternative stud 50, which is similar in dimensions to the stud 32 of FIG. 3. The stud 50 has a main body portion 52 and a secondary portion 54 integrally connected by a neck portion 56, with the stud in fact being an integral body of abrasion resistant metallic material. The lower surface of the main portion 52 has a small central projection 58 over which an aluminum washer 60 is a force fit, the aluminum washer 60 serving the same purpose as the aluminum tip 42 in the embodiment of FIG. 3.

The advantages of the present invention will therefore be clearly apparent from the above description. Other embodiments and examples will also be apparent to a person skilled in the art, the scope of the invention being defined in the appended claims.

What we claim as new and desire to protect by Letters Patent of the United States is:

1. A method of protecting a ground engaging metallic surface of a ground engaging tool susceptible to wear by rock-like material sliding over the surface comprising providing studs of abrasion resistant metallic material selected from the group consisting of studs of cast abrasion resistant metallic material and studs of compacted abrasion resistant metallic material powder, and stud welding said studs to the surface to protect the surface from such wear.

2. A method according to claim 1 including stud welding to the surface stud assemblies each comprising a first portion weldable to the surface and a second metallic portion attachable to stud welding equipment, with the first portion being connected to the second portion by frangible metallic connecting means, and removing said second portions of said studs by breaking said connecting means.

3. A method according to claim 2 wherein the second portion has a larger mass than the first portion.

4. A method according to claim 1 wherein the studs are of cast abrasion resistant metallic material.

5. A method according to claim 4 wherein the surface is at least a portion of the surface of a chute down which rock-like material is passed.

6. A method according to claim 4 wherein the surface is a surface of earth-working equipment which in use engages rock-like material in the ground.

7. A method according to claim 4 wherein the studs are of high carbon chromium-containing steel alloy.

8. A method according to claim 7 wherein the steel alloy contains about 4% carbon and about 33% chromium.

9. A discharge chute for conveying rock-like material from one height to a lower height, said chute having an upper surface over which the rock-like material passes, and a series of studs of abrasion resistant metallic material stud welded to the said surface in closely spaced relationship to protect the surface from wear by rock-like material sliding thereover, said studs being selected from the group consisting of studs of cast abrasion resistant metallic material and studs of compacted abrasion resistant metallic material powder.

10. A discharge chute according to claim 9 wherein the studs are of cast abrasion resistant metallic material.

11. A discharge chute according to claim 10 wherein the studs are of high carbon chromium-containing steel alloy.

12. A discharge chute according to claim 11 wherein the steel alloy contains about 4% carbon and about 33% chromium.

13. A ground engaging tool comprising a metallic body with a base, side walls extending upwardly from opposite sides of the base, and a rear wall extending upwardly from the rear of the base between the side walls, and at least one of the ground-engaging surfaces of the base and side walls having a series of studs of abrasion resistant metallic material stud welded thereto in closely spaced relationship to protect the surface from rock-like material sliding thereover.

14. A ground engaging tool according to claim 13 wherein said studs are selected from the group consisting of studs of cast abrasion resistant metallic material and studs of compacted abrasion resistant metallic material powder.

15. A ground engaging tool according to claim 14 wherein the studs are of cast abrasion resistant metallic material.

16. A ground engaging tool according to claim 15 wherein the studs are of high carbon chromium-containing steel alloy.

17. A ground engaging tool according to claim 16 wherein the steel alloy contains about 4% carbon and about 33% chromium.

18. A ground engaging article having a ground engaging metallic surface susceptible to wear by rock-like material sliding over the surface, and a plurality of studs of abrasion resistant metallic material stud welded to the surface in closely spaced relationship to protect the surface from rock-like material sliding thereover, said studs being selected from the group consisting of studs of cast abrasion resistant metallic material and studs of compacted abrasion resistant metallic material powder.

19. An article according to claim 18 wherein the studs are of cast abrasion resistant material.

20. An article according to claim 19 wherein the studs are of high carbon chromium-containing steel alloy.

21. An article according to claim 20 wherein the steel alloy contains about 4% carbon and about 33% chromium.

* * * * *